(12) United States Patent
Waltho et al.

(10) Patent No.: US 7,283,597 B2
(45) Date of Patent: Oct. 16, 2007

(54) RECEIVER FOR REAL-TIME ADJACENT CHANNEL CHARACTERIZATION

(75) Inventors: Alan E. Waltho, San Jose, CA (US); Jeffrey Schiffer, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 10/812,300

(22) Filed: Mar. 29, 2004

(65) Prior Publication Data

US 2005/0215203 A1    Sep. 29, 2005

(51) Int. Cl.
*H04L 27/04* (2006.01)
(52) U.S. Cl. ..................................... 375/316
(58) Field of Classification Search ............. 375/224, 375/226, 227, 316; 455/68, 69
See application file for complete search history.

(56) References Cited

U.S. PATENT DOCUMENTS

| | | | |
|---|---|---|---|
| 6,252,910 B1 * | 6/2001 | West et al. ................. 375/261 |
| 7,046,694 B2 * | 5/2006 | Kumar ....................... 370/487 |
| 7,155,179 B1 * | 12/2006 | Rothenberg ............. 455/114.2 |
| 2003/0025841 A1 * | 2/2003 | Sawyer ........................ 348/734 |
| 2004/0137947 A1 * | 7/2004 | Nimmo-Smith ............. 455/561 |
| 2005/0220214 A1 | 10/2005 | Waltho et al. |

* cited by examiner

*Primary Examiner*—Don N. Vo
(74) *Attorney, Agent, or Firm*—Schwegman, Lundberg & Woessner, P.A.

(57) ABSTRACT

Receivers for real-time adjacent channel characterization, along with associated systems and methods, are generally provided.

26 Claims, 6 Drawing Sheets

RECEIVER FOR REAL-TIME ADJACENT CHANNEL CHARACTERIZATION

TECHNICAL FIELD

This application relates generally to wireless communication systems and, more particularly, to wireless receiver technology with the capability to receive communications on a wireless communication channel and characterize/monitor adjacent channels in real time.

BACKGROUND

A communication channel is a general term used to describe a communications path, either physical or logical, between two systems. Radio waves are electromagnetic waves that can be used in wireless communication, and the radio frequency (RF) of these waves serves as physical communication channels. The RF spectrum has a finite range of frequencies, and thus a limited number of channels. In the United States, the Federal Communications Commission (FCC) decides how the spectrum is allocated, and what bands are used for what purpose. For example, television stations transmit generally high power RF signals in the VHF frequency range (54-88 MHz corresponding to channels 2-6 and 174-216 MHz corresponding to channels 7-13) and the UHF frequency range (470-806 MHz corresponding to channels 14-69). Currently the FCC is proposing to allow communications by unlicensed devices in these bands providing that they operate on a non-interfering basis.

Communication signals on adjacent channels can interfere with communications on the desired channel. This adjacent-channel interference can be caused by inadequate filtering, such as incomplete filtering of unwanted modulation products, improper tuning, or poor frequency control in the reference and/or the interfering channel. Adjacent-channel interference can increase with an increase in signal power in adjacent channels.

DETAILED DESCRIPTION

The following detailed description of the present subject matter refers to the accompanying drawings which show, by way of illustration, specific aspects and embodiments in which the present subject matter may be practiced. These embodiments are described in sufficient detail to enable those skilled in the art to practice the present subject matter. Other embodiments may be utilized and structural, logical, and electrical changes may be made without departing from the scope of the present subject matter. References to "an", "one", or "various" embodiments in this disclosure are not necessarily to the same embodiment, and such references contemplate more than one embodiment. Additionally, various embodiments can be combined to provide other embodiments. The following detailed description is, therefore, not to be taken in a limiting sense, and the scope is defined only by the appended claims, along with the full scope of legal equivalents to which such claims are entitled.

Figure 1:
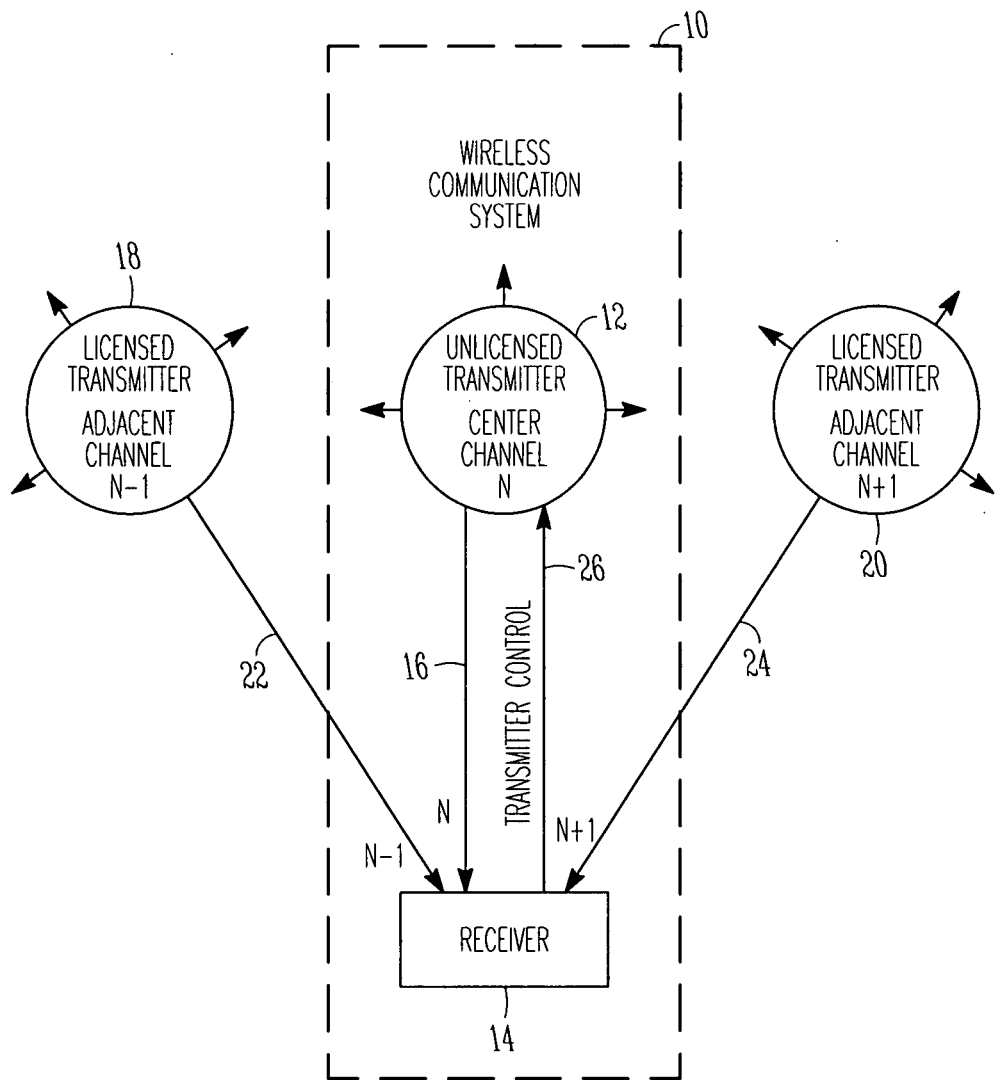
FIG. 1 illustrates a communication system operating on a channel (n) with adjacent channels centered at (n−1 and n+1), according to various embodiments of the present subject matter.

FIG. 1 illustrates a communication system operating on a channel (n) with adjacent channels centered at (n−1 and n+1), according to various embodiments of the present subject matter. The illustrated wireless system 10 includes a transmitter 12 and a receiver 14. The transmitter 12 is adapted to transmit and the receiver 14 is adapted to receive a signal over a wireless channel n, illustrated at 16. One example of a wireless system includes an RF transmitter and an RF receiver, also referred to as an RF radio.

The illustrated system operates within an environment where other transmitters are transmitting over wireless channels, such as a number of RF channels in a frequency spectrum. When an RF radio is in range, it can be tuned to receive signals over these RF channels. FIG. 1 illustrates two transmitters 18 and 20 that are transmitting signals within the RF spectrum. The illustrated transmitter 18 is transmitting signals over an adjacent channel n−1, illustrated at 22 and the illustrated transmitter 20 is transmitting signals over an adjacent channel n+1 with respect to a center channel n, illustrated at 24. The center channel can be affected by adjacent channel interference such that signals on the adjacent channels can interfere with signals on the center channel, and at a sufficient power level, a signal on the center channel can interfere with signals on the adjacent channels.

Various embodiments of the communication system 10 communicate over a channel n that is in a VHF or UHF frequency range. In these embodiments, the transmitters 18 and 20 are representative of television signal transmitters that are transmitting in the VHF or UHF frequency range. To simplify the discussion, this disclosure indicates that the adjacent channels are TV channels, and that licensed TV stations use the adjacent channels. However, the present subject matter can be implemented within environments where the adjacent channels are being used by other licensed transmitters. Other embodiments of the communication system 10 communicate over a channel n that is in a FM broadcast frequency range, such that transmitters 18 and 20 are representative of radio station transmitters that are transmitting in the FM broadcast frequency range. The present subject matter is not limited to a particular frequency range. Those of ordinary skill in the art will understand, upon reading and comprehending the present disclosure, how to design communication systems 10 in accordance with the present subject matter to operate in a variety of frequency ranges.

With reference to FIG. 1, the receiver 14 is adapted to receive a modulated signal from an unlicensed transmitter 12 on a wireless channel n 16, and first and second adjacent modulated signals from licensed transmitters 18 and 20, such as TV stations, on adjacent wireless channel n−1 represented at 22 and adjacent wireless channel n+1 represented at 24. The receiver 14 is further adapted to simultaneously process the center modulated signal n into a baseband signal and to characterize the first and second adjacent modulated signals. According to various embodiments, characterizing the adjacent modulated signals includes determining a power level associated with the adjacent modulate signals. The receiver 14 is further adapted to send a control signal, illustrated at 26, to the transmitter 12 based on a characterization of the first and second adjacent modulated signals. According to various embodiments, the control signal 26 instructs the transmitter 12 to change a transmission power level. Thus, the system 10 is able to tailor the power level so as to provide a strong communication signal that will not interfere with TV communications over either of the adjacent channels. According to various embodiments, the control signal 26 instructs the transmitter 12 to change a transmission frequency to another available RF channel, as determined by a frequency scan by the receiver 14. The receiver 14 is adapted to receive and process the signals on channels n−1, n, and n+1, corresponding to the new RF channel.

Aspects of the present subject matter provide a receiver capable of characterizing adjacent channels in real time. The characterizing of adjacent channels involves monitoring the power level of the signals, and further involves detecting the signal type in order to maintain the appropriate signal-to-noise ratio for the signal type. For example, an analog NTSC (National Television Standards Committee) TV signal requires a 40 dB signal-to-noise ratio and a digital TV signal requires a 15 dB signal-to-noise ratio. Multiple receivers or scanning receivers can be used in applications similar to that shown in FIG. 1. However, multiple receivers triple the cost and power consumption because each of the central channel and both adjacent channels use a separate receiver. Furthermore, scanning does not permit real time control of the transmitter and risks missing messages if the receiver is not constantly tuned to the operational channel. Although a strict timing protocol could be used to mitigate the risk of message loss, the overall throughput would be degraded. The present subject matter balances the signal levels on a channel by channel basis within a block receiver, which is used to simultaneous characterize two adjacent channels while receiving on a central channel. The block receiver is capable of using this information to provide real-time control of the transmitter that is transmitting over channel n.

Figure 2:
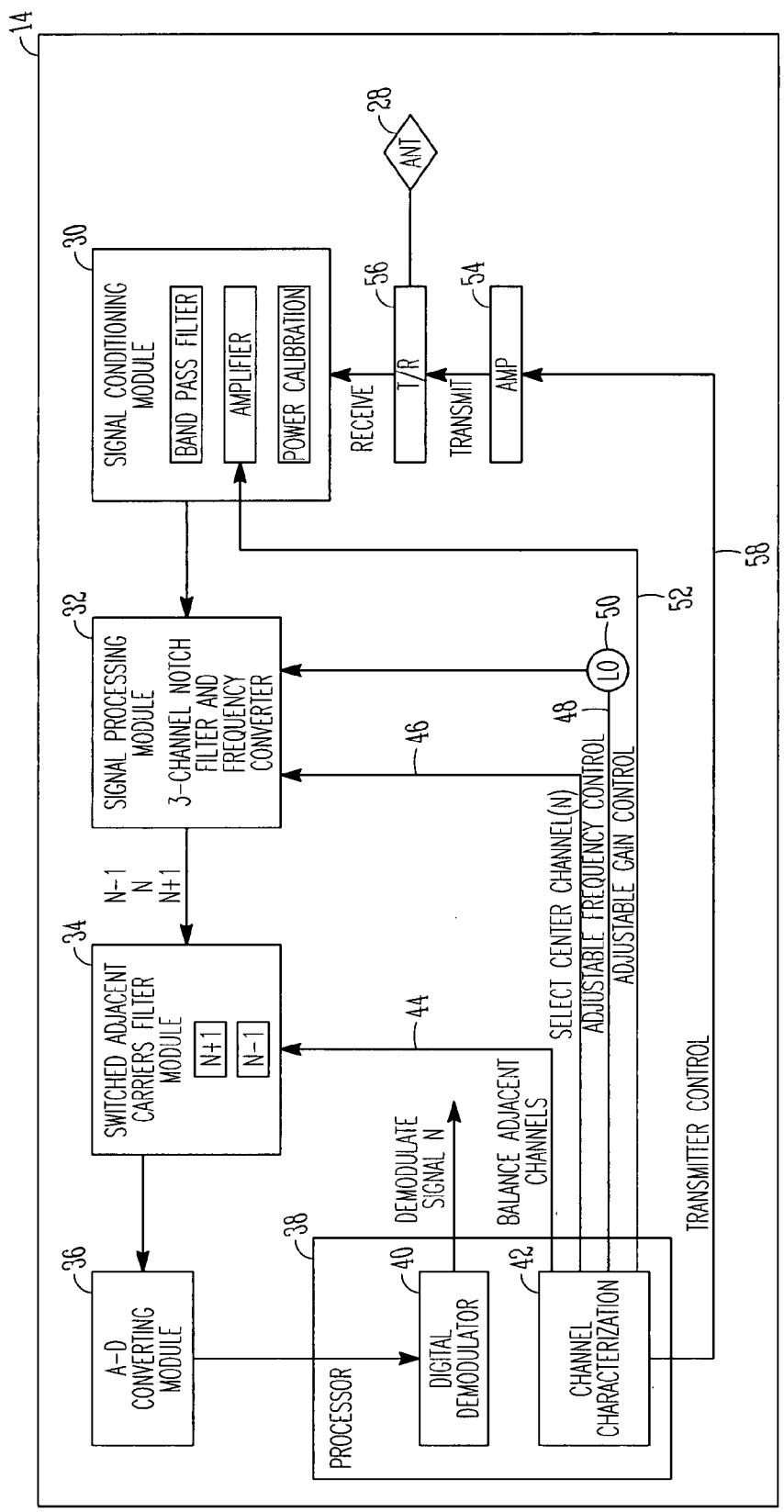
FIG. 2 illustrates a receiver, such as can be used in the system of FIG. 1, according to various embodiments of the present subject matter.

FIG. 2 illustrates a receiver, such as can be used in the system in FIG. 1, according to various embodiments of the present subject matter. The illustrated receiver 14 includes an antenna 28 which receives a wireless signal having modulated frequencies corresponding to at least a wireless channel n and two adjacent TV channels n−1 and n+1. The receiver demodulates signals transmitted using a frequency corresponding to channel n and processes signals transmitted using frequencies corresponding to adjacent channels n−1 and n+1 to characterize these adjacent channels. According to various embodiments, the antenna function is provided by a substantially omni-directional antenna connected to the receiver. Other embodiments use a substantially directional antenna.

The illustrated receiver 14 further includes a signal conditioning module 30 adapted to condition the received signal for further processing. Various embodiments of the signal conditioning module 30 filter and amplify the received signal. Some embodiments of the module 30 include at least one bandpass filter to pass UHF frequencies. Other bandpass filters can be used to pass other frequency ranges. Various embodiments of the module 30 calibrate the power of the signal in preparation for further processing.

The illustrated receiver 14 further includes a signal processing module 32 to filter the signal. The module filters the signal to pass three channels corresponding to channels n−1, n and n+1. Various embodiments of the module 32 frequency convert the signal such that the resulting signal has predetermined frequencies corresponding to channels n−1, n, and n+1, regardless of the frequencies corresponding to the channels n−1, n and n+1 in the wireless signal received at the antenna 28.

The illustrated receiver 14 further includes a switched adjacent carrier filter module 34 to independently filter the frequencies corresponding to the adjacent channels n−1 and n+1, and to provide additional attenuation of the signals present in the adjacent channels n−1 and n+1 while not affecting the center channel n. The illustrated receiver 14 further includes an analog-to-digital (A-D) converting module 36 to convert the desired received signal to a digital representation for further processing.

The illustrated receiver 14 further includes a processor 38. The processor 38 receives the digital signal from the A-D converting module 36. The illustrated processor 38 includes a demodulator module 40, implemented in code, hardware, or a combination thereof, to process the digital signal and provide a baseband signal for the signal received on channel n. The illustrated processor 38 further includes a channel characterization module 42, implemented in code, hardware, or a combination thereof, to characterize the adjacent channels n−1 and n+1. Various embodiments of module 42 provide various control signals represented by 44 to the switched adjacent carrier filter module 34 for use to attenuated the signals present on the adjacent channels. Various embodiments of module 42 provide control signals represented by 46 to the signal processing module 32 for use to select a desired channel n to be demodulated. Various embodiments of module 42 provide an adjustable frequency control signal represented by 48 to the signal processing module 32 for use with a local oscillator (LO) 50 to frequency convert the signal such that a resulting signal has predetermined frequencies corresponding to channels n−1, n, and n+1, regardless of the frequencies corresponding to the channels n−1, n and n+1 in the wireless signal received at the antenna 28. Various embodiments of module 42 provide an adjustable gain control signal represented by 52 to the signal conditioning module 30 to control amplification of the received signal.

The illustrated receiver 14 further includes an amplifier 54 and a transmit/receive (T/R) switch 56. Various embodiments of module 42 in the processor 38 provide various transmitter control signals represented by 58 to the amplifier 54 which then sends the transmit signal to the antenna 28 via the T/R switch, such that the transmitter output signal is wirelessly transmitted by the antenna on channel n.

Figure 3:
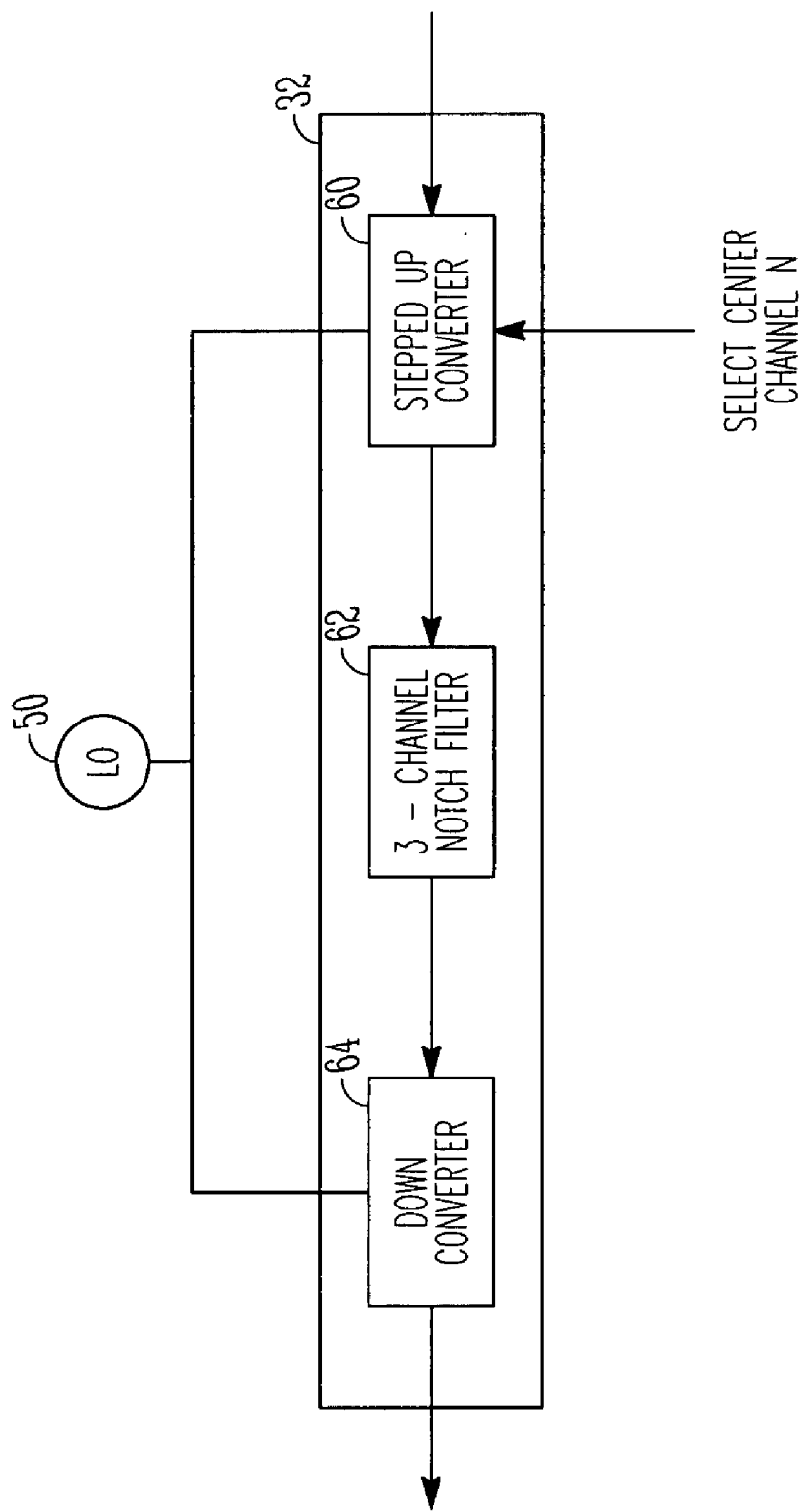
FIG. 3 illustrates a signal processing module, such as can be used in the receiver illustrated in FIG. 2, according to various embodiments of the present subject matter.

FIG. 3 illustrates a signal processing module, such as can be used in the receiver illustrated in FIG. 2, according to various embodiments of the present subject matter. The illustrated signal processing module 32 filters the signal to pass three channels corresponding to channels n−1, n and n+1, and frequency converts the signal such that the signal has predetermined frequencies corresponding to channels n−1, n, and n+1, regardless of the frequencies corresponding to the physical channels n−1, n and n+1 in the wireless signal. The illustrated signal processing module 32 includes a stepped up-converter 60, a 3-channel bandpass filter 62 and a down-converter 64.

The up-converter 60 converts a processed signal from the signal conditioning module 30, illustrated in FIG. 2, into an up-converted signal with predetermined up-converted frequencies. Various embodiments of the converter 60 receive a signal indicative of a selected center channel n, and appropriately increases the frequency such that up-converted channels n−1, n and n+1 have predetermined up-converted frequencies, regardless of the frequency of channel n before being up-converted. Various embodiments of the converter 60 provide frequency steps that correspond with the known frequency spans of the channels, such as 6 MHz steps for UHF channels. A local oscillator 50 of the receiver is used in the up-conversion process.

The 3-channel bandpass filter 62 filters the up-converted signal to pass channels n−1, n and n+1, which have known up-converted frequencies, and filters out the frequencies that do not correspond to the predetermined up-converted frequencies of channels n−1, n and n+1. Various embodiments of the bandpass filter include a surface acoustic wave (SAW) filter, which provides desired bandpass filter characteristics for these higher frequencies associated with the up-converted signal provided by the up-converter 60.

The down-converter 64 is adapted to convert the filtered signal into a down-converted signal with decreased frequencies. Channels n−1, n and n+1 have predetermined down-converted frequencies in the down-converted signal. The local oscillator 50 of the receiver is used in the down-conversion process. The down-converted signal is passed to the switched adjacent carrier filter module 34.

Figure 4:
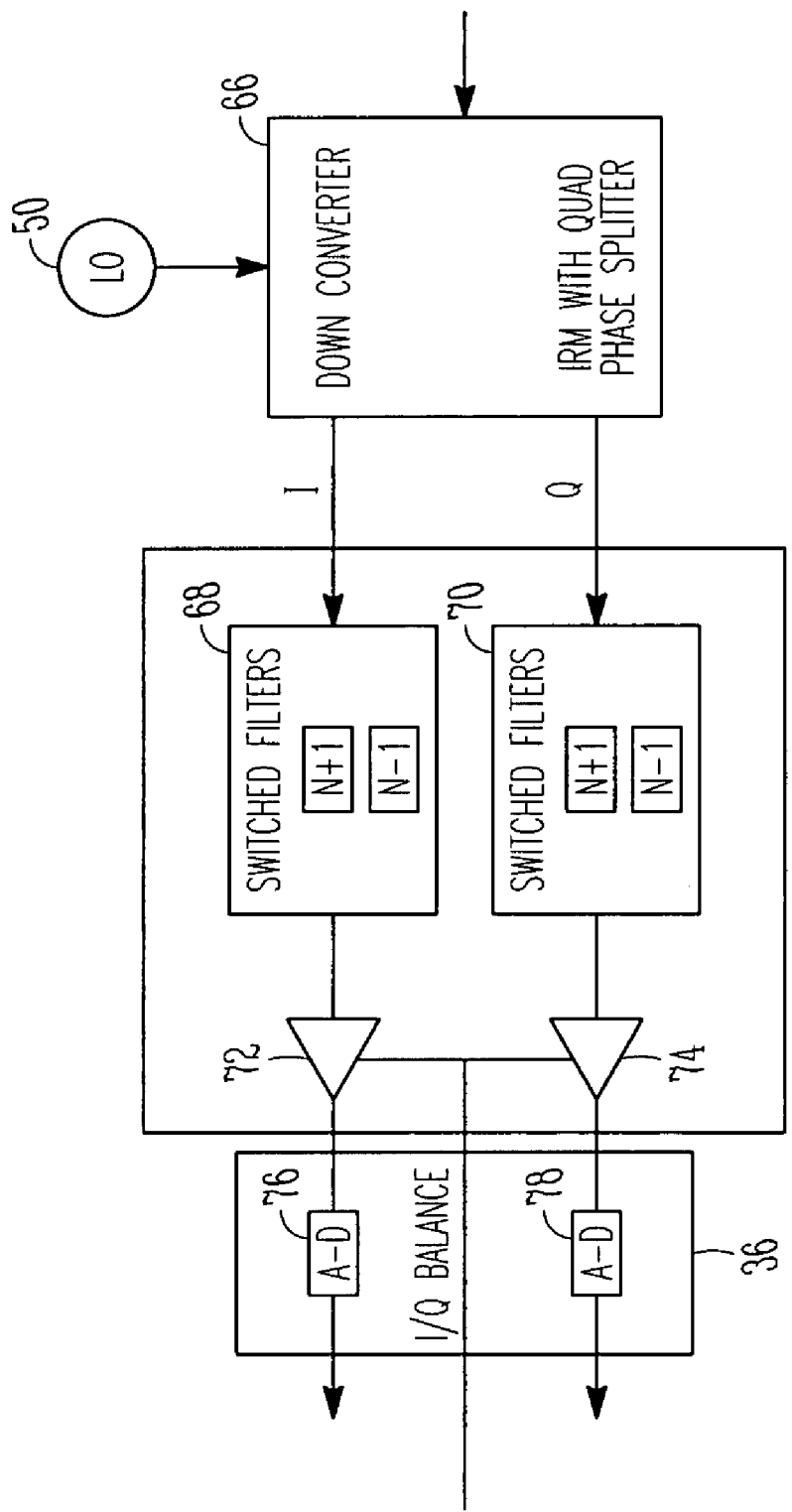
FIG. 4 illustrates a down-converter, switched adjacent carrier filters, and analog to digital converters for various embodiments of a receiver.

FIG. 4 illustrates a down-converter, switched adjacent carrier filters, and analog to digital converters for various embodiments of a receiver. The illustrated down-converter 66, which generally corresponds to the down-converter in FIG. 4, is connected to a local oscillator 50, and includes an image reject mixer (IRM) with a quad phase splitter to provide an in-phase signal (I) and a quadrature-phase signal (Q) for processing by the switched adjacent carrier filter module 34. Module 34 independently filters the adjacent channels n−1 and n+1 of both the I and Q signals. The figure illustrates separate filters 68 and 70 for each of the I and Q signals, respectively, and each illustrated filter 68 and 70 includes a module for filtering the first adjacent channel n−1 and a module for filtering the second adjacent channel n+1. The switched adjacent carrier filter module 34 further includes amplifiers 72 and 74 connected to an I/Q balance control line. The A-D converting module 36 converts the desired signal from channel n to a digital signal. The figure illustrates that both of the I and Q signals have their own A-D converters 76 and 78, respectively. Alternative implementations that do not include the I & Q complex components may be used for modulation schemes that do not include phase or frequency modulation.

Figure 5:
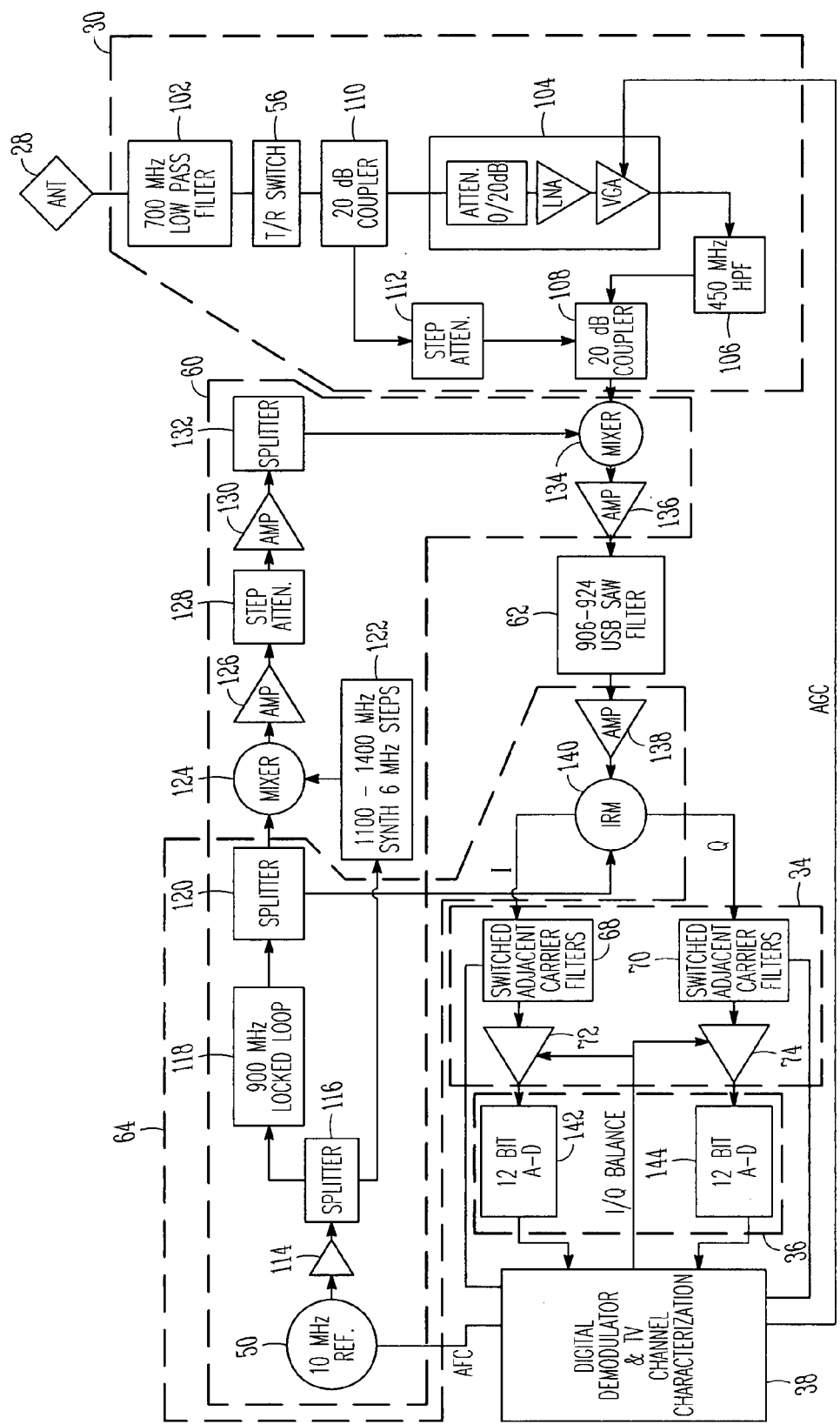
FIG. 5 illustrates a receiver, such as illustrated in FIGS. 1 and 2, in more detail according to various embodiments of the present subject matter.

FIG. 5 illustrates a receiver, such as illustrated in FIGS. 1 and 2, in more detail according to various embodiments of the present subject matter. FIG. 5 generally illustrates the signal conditioning module 30, the up-converter 60, the bandpass filter 62 and the down-converter 64 of the signal processing module 32, the switched adjacent carrier filter module 34, and the A-D converting module 36 with dotted lines. These modules generally correspond to the modules illustrated in FIGS. 2 and 3.

With reference to FIG. 5, the illustrated signal conditioning module 30 includes a 700 MHz low pass filter 102 connected to the antenna 28, which is connected to the T/R switch 56. The module 30 further includes a 20 dB coupler 110 and a low noise amplifier module 104, which includes an attenuator, a low noise amplifier (LNA) and a variable gain amplifier (VGA) which is controlled by an adjustable gain control (AGC) signal. The module 30 further includes a 450 MHz high pass filter 106 (this could also be a 450 to 750 Bandpass filter) connected to the low noise amplifier module 104. The illustrated combination of the 700 MHz low pass filter 102 and the 450 MHz high pass filter 106 passes 450-700 MHz UHF frequencies which generally corresponds to UHF television channels 14 through 52. A power calibration signal is provided by a step attenuator 112.

The up-converter 60 and the down-converter 64 share some common components, including a 10 MHz reference oscillator 50, an amplifier 114, a splitter 116 for the reference signal, and a 900 MHz phase locked loop circuit 118 based on the frequency of the local oscillator 50, to provide a 900 MHz signal to a splitter 120.

The up-converter 60 further includes a synthesizer 122 connected to the local oscillator 50 via splitter 116, and includes a mixer 124. The illustrated synthesizer is adapted to provide a frequency within a range of 1100-1400 MHz in 6 MHz steps. These steps correspond to the frequency span for a UHF channel. Other frequencies and steps can be used for other frequencies and frequency spans. In general, a mixer is a nonlinear analog circuit or device that accepts at its input two signals and presents at its output a signal having a frequency equal to either the sum of the frequencies of the input signals or the difference between the input signals. The illustrated mixer 124 outputs the difference between the 1100 to 1400 MHz and 900 MHz input signals to output a 200 to 500 MHz signal into an amplifier 126, a step attenuator 128, an amplifier 130, a splitter 132 and to a mixer 134. Mixer 134 outputs the sum of the 200 to 400 MHz signal and the 450 to 700 MHz UHF signal received from the signal conditioning module 30. The 200 to 500 MHz input signal is capable of being selected in 6 MHz steps, based on the synthesizer 122. The 200-500 MHz input signal is selected based on a frequency corresponding to a desired channel n so that the mixer outputs a signal to amplifier 136 that includes a 915 MHz frequency component to correspond to the center frequency of channel n, a 909 MHz frequency component for channel n−1 and a 921 MHz frequency component for channel n+1. Thus, channels n−1, n, and n+1 have predetermined up-converted frequencies, regardless of the frequency for a selected channel n.

UHF channels N−1, N and N+1 have 6 MHz frequency spans. Thus, a 906-924 MHz bandpass filter 62 passes the center channel N and adjacent channels N−1 and N+1, and filters out other frequencies that do not correspond to these three channels. Various embodiments of the 3-channel bandpass filter includes a surface acoustic wave (SAW) bandpass filter.

In addition to the common components 50, 114, 116, 118 and 120 shared with the up-converter 60, the down-converter 64 includes an amplifier 138 to a filtered signal from filter 62, and an image reject mixer (IRM) 140. The illustrated IRM mixer 140 outputs the difference between the frequencies contained in the filtered signal (909 MHz corresponding to channel N−1, 915 MHz corresponding to channel N, and 921 MHz corresponding to channel N+1) and a 900 MHz signal from splitter 120 and input signals to output a 200 to 500 MHz signal into to produce an output signal centered around 9 MHz, 15 MHz and 21 MHz frequency components. The illustrated IRM mixer 140 includes a quad phase splitter to provide an in-phase output signal (I) and a quadrature-phase output signal (Q) with 9 MHz, 15 MHz and 21 MHz frequency components.

The switched adjacent carrier filter module 34 receives both the I and Q signals, and independently filters the adjacent carrier signals N−1 and N+1 corresponding to channels centered at 9 and 21 MHz, respectively. The resulting signals are I/Q balanced using amplifiers 72 and 74. The illustrated A-D converter module 36 includes two A-D converters 142 and 144 to convert the analog I and Q signals into digital signals for demodulation and characterization of the adjacent channels, which is performed by a controller or processor 38.

The illustrated receiver uses adaptive baseband filtering to reduce the dynamic range at the input to the A-D's. The receiver uses a high IF block conversion with subsequent down-conversion to base band of three adjacent channels. As a result the dynamic range between the highest and lowest signals is 104 dB at baseband, which normally requires an 18 bit A-D converter. The dynamic range presented to the A-D's is reduced through the use of switchable baseband filters operating independently in each of the adjacent channels. The combined filters suppress the higher level carrier signals by approximately 30 dB so that the dynamic range at the input to the A-D is reduced to 74 dB requiring a readily achievable 12 bit A-D.

Figure 6:
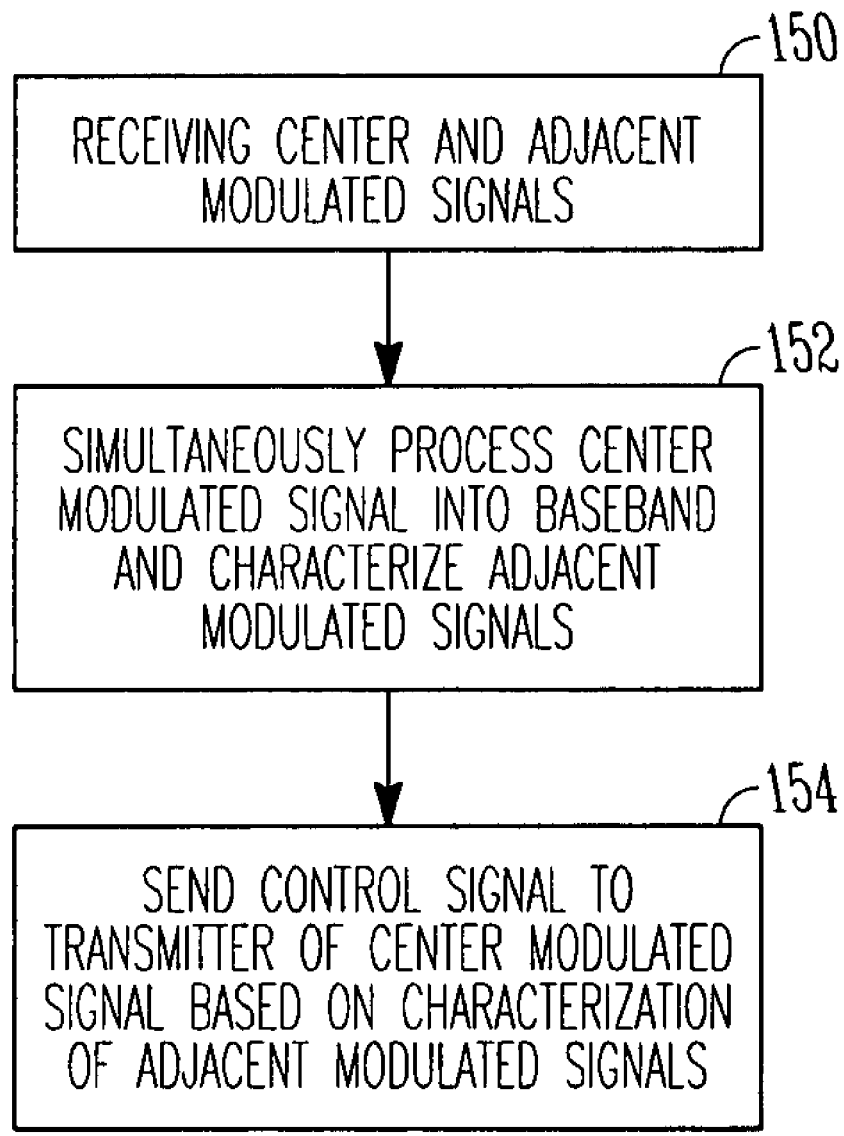
FIG. 6 illustrates a wireless communication method for receiving communication on a wireless communication channel and simultaneously monitoring and characterizing adjacent channels.

FIG. 6 illustrates a wireless communication method for receiving communications on a wireless communication channel and simultaneously monitoring and characterizing adjacent channels. Center and adjacent modulated signals are received at 150. At 152, the center modulated signal is processed into a baseband signal simultaneously while the adjacent modulated signals are characterized. At 154, a control signal is sent to the transmitter of the center modulated signal based on a characterization of the adjacent modulated signals.

Various embodiments of the present subject matter are implemented in a number of communication applications. One application, for example, provides highly siliconized WiFi radio receivers that are compatible with digital TV, which allows low cost, wireless connection of video services, such as may be desirable in digital homes. One application involves relatively low power and long distance wireless networking via available television channels, for example. These examples are not intended to be all-inclusive. The present subject matter can be used to set up communication systems that use underused portions of the frequency spectrum and that effectively and intelligently share the frequency spectrum without interfering with other uses of the frequency spectrum.

One of ordinary skill in the art will understand that, the modules and other circuitry shown and described herein can be implemented using software, hardware, and combinations of software and hardware. As such, the term module is intended to encompass software implementations, hardware implementations, and software and hardware implementations.

The methods illustrated in this disclosure are not intended to be exclusive of other methods within the scope of the present subject matter. Those of ordinary skill in the art will understand, upon reading and comprehending this disclosure, other methods within the scope of the present subject matter. The above-identified embodiments, and portions of the illustrated embodiments, are not necessarily mutually exclusive. These embodiments, or portions thereof, can be combined. In various embodiments, the methods provided above are implemented as a computer data signal embodied in a carrier wave or propagated signal, that represents a sequence of instructions which, when executed by a processor cause the processor to perform the respective method. In various embodiments, methods provided above are implemented as a set of instructions contained on a computer-accessible medium capable of directing a processor to perform the respective method. In various embodiments, the medium is a magnetic medium, an electronic medium, or an optical medium.

Although specific embodiments have been illustrated and described herein, it will be appreciated by those of ordinary skill in the art that any arrangement which is calculated to achieve the same purpose may be substituted for the specific embodiment shown. This application is intended to cover adaptations or variations of the present subject matter. It is to be understood that the above description is intended to be illustrative, and not restrictive. Combinations of the above embodiments as well as combinations of portions of the above embodiments in other embodiments will be apparent to those of skill in the art upon reviewing the above description. The scope of the present subject matter should be determined with reference to the appended claims, along with the full scope of equivalents to which such claims are entitled.

What is claimed is:

1. A wireless communication method, comprising:
   receiving a center modulated signal on a wireless channel n, a lower adjacent modulated signal on a lower adjacent licensed channel n−1, and a higher adjacent modulated signal on a higher adjacent licensed channel n+1;
   simultaneously processing the center modulated signal into a baseband signal and characterizing the lower and higher adjacent modulated signals; and
   sending a control signal to a transmitter of the center modulated signal based on a characterization of the lower and higher adjacent modulated signals.

2. The method of claim 1, wherein receiving a center modulated signal on a wireless channel n, a lower adjacent modulated signal on a lower adjacent licensed channel n−1, and a higher adjacent modulated signal on a higher adjacent licensed channel n+1 includes filtering a representative signal of a received signal through a three channel filter to provide representative signals of the center modulated signal and the lower and higher adjacent modulated signals.

3. The method of claim 1, simultaneously processing the center modulated signal into a baseband signal and characterizing the lower and higher adjacent modulated signals includes:
   conditioning the center modulated signal and the lower and higher adjacent modulated signals into a filtered signal; and
   processing the filtered signal into a processed signal using a three channel bandpass filter and frequency converter to provide the processed signal with a known first frequency to carry a representative signal for the lower adjacent modulated signal, a known second frequency to carry a representative signal for the center modulated signal, and a known third frequency to carry a representative signal for the higher adjacent modulated signal.

4. The method of claim 3, wherein simultaneously processing the center modulated signal into a baseband signal and characterizing the lower and higher adjacent modulated signals further includes:
   independently filtering the processed signal using a switched filter to suppress the known lower and higher adjacent modulated signals;
   converting the processed signal from an analog signal into a digital signal;
   demodulating the digital signal to provide the baseband signal; and
   characterizing the lower and higher adjacent modulated signals.

5. The method of claim 1, wherein sending a control signal to a transmitter of the desired signal based on a characterization of the lower and higher adjacent modulated signals includes sending a control signal to the transmitter to change a transmission frequency to another available channel.

6. The method of claim 1, wherein sending a control signal to a transmitter of the desired signal based on a characterization of the lower and higher adjacent modulated signals includes sending a control signal to the transmitter to modify a power level for a transmission of the desired signal.

7. A receiver, comprising:
  means to receive a wireless signal having modulated frequencies corresponding to at least a wireless channel n and two adjacent licensed channels n−1 and n+1;
  means to process the wireless signal to simultaneously provide a baseband signal corresponding to the wireless channel n and characterize signals corresponding to the two adjacent channels n−1 and n+1; and
  means to send a control signal to a transmitter adapted to transmit a signal over wireless channel n based on a characterization of the signals corresponding to the two adjacent channels n−1 and n+1.

8. The receiver of claim 7, wherein the means to process the wireless signal to simultaneously provide a baseband signal corresponding to the wireless channel n and characterize signals corresponding to the two adjacent channels n−1 and n+1 includes:
  means to filter a signal representative of the wireless signal into a signal having first, second and third frequencies corresponding to channels n−1, n and n+1; and
  means to demodulate a signal corresponding to the second frequency and to characterize signals corresponding to the first and third frequencies.

9. The receiver of claim 8, further comprising means to independently adjust signal levels on the first and third frequencies.

10. The receiver of claim 7, wherein the means to process the wireless signal to simultaneously provide a baseband signal corresponding to the wireless channel n and characterize signals corresponding to the two adjacent channels n−1 and n+1 includes:
  means to up-convert a first signal representative of the wireless signal into an up-converted second signal such that a frequency corresponding to channel N is increased to a known up-converted center frequency and frequencies corresponding to the adjacent channels N−1 and N+1 are increased to up-converted adjacent frequencies;
  means to filter the up-converted second signal to pass the up-converted center frequency and the up-converted adjacent frequencies as a filtered up-converted third signal;
  means to down-convert the third signal to a down-converted fourth signal that includes a known down-converted center frequency corresponding to the channel n and known down-converted adjacent frequencies corresponding to channels n−1 and n+1;
  means to independently filter and balance the known down-converted adjacent frequencies to reduce dynamic range; and
  means to demodulate the down-converted center frequency into the baseband frequency and characterize the balanced adjacent channel frequency components.

11. A receiver, comprising:
  a signal processing module to filter and frequency convert a signal representative of a radio frequency (RF) signal to provide a processed signal having predetermined first, second and third frequencies, the predetermined second known frequency corresponding to a center channel n of the RF signal, and the predetermined first and third frequencies corresponding to adjacent licensed RF channels n−1 and n+1;
  an adjacent carrier filter module to independently filter the predetermined first and third frequencies of the processed signal and to provide a balanced signal representative of channels n−1, n and n+1;
  an analog-to-digital converting module to convert the balanced signal from an analog signal to a digital signal; and
  a processor to receive the digital signal, provide a baseband signal for the RF channel n and characterize the adjacent RF channels n−1 and n+1.

12. The receiver of claim 11, wherein the processor is adapted to provide a transmitter control signal to be transmitted to a transmitter adapted to transmit signals on channel n.

13. The receiver of claim 12, wherein the transmitter control signal includes a signal for the transmitter to adjust a power level for a transmission on channel n.

14. The receiver of claim 12, wherein the transmitter control signal includes a signal for the transmitter to transmit on another channel.

15. The receiver of claim 11, wherein the signal processing module includes:
  an up-converter to convert the processed signal into an up-converted signal with increased frequencies such that the center channel n and the adjacent channels n−1 and n+1 in the up-converted signal have known up-converted frequencies;
  a bandpass filter to filter the up-converted signal and pass a filtered signal with known up-converted frequencies corresponding to the center channel n and the adjacent channels n−1 and n+1; and
  a down-converter to convert the filtered signal into a down-converted signal with decreased frequencies such that the center channel n and the adjacent channels n−1 and n+1 in the down-converted signal have known down-converted frequencies.

16. The receiver of claim 11, further comprising a signal conditioning module including at least one bandpass filter module.

17. The receiver of claim 16, wherein the at least one bandpass filter module is adapted to pass frequencies within a UHF frequency range.

18. The receiver of claim 11, further comprising a signal conditioning module including a power calibration module to adjust an amplitude of the signal representative of a radio frequency (RF) signal based on a power level of the RF signal.

19. The receiver of claim 11, further comprising a signal conditioning module adapted to pass the conditioned signal with a frequencies between approximately 450 MHz and approximately 700 MHz, wherein the signal processing module includes:
  an up-converter to synthesize the conditioned signal with a up-conversion mixing signal having a frequency within a range of approximately 200 MHz to 500 MHz, the frequency of the up-conversion mixing signal being selectable in 6 MHz steps based on the frequency of channel n such that channel N in a resulting up-converted signal has a center frequency of approximately 915 MHz;

a surface acoustic wave (SAW) filter to filter the up-converted signal and pass frequencies within a range of approximately 906 MHz to 924 MHz as a filtered up-converted signal, wherein channel n is represented at a center frequency of approximately 915 MHz in the filtered up-converted signal, channel n−1 is represented at a center frequency of approximately 909 MHz in the filtered up-converted signal; and channel n+1 is represented at a center frequency of approximately 921 MHz in the filtered up-converted signal; and a down-converter to mix the filtered up-converted signal with a down-conversion mixing signal have a frequency of approximately 900 MHz to provide a down-converted signal within a range of approximately 6 MHz to 24 MHz, wherein channel n is represented at a center frequency of approximately 15 MHz in the down-converted signal, channel n−1 is represented at a center frequency of approximately 9 MHz in the down-converted signal, and channel n+1 is represented at a center frequency of approximately 21 MHz in the down-converted signal.

20. The receiver of claim 19, wherein:

the down-converter includes an image reject mixer to provide an in-phase signal (I) and a quadrature-phase signal (Q); and the adjacent carrier filter module to independently filter and suppress the 9 MHz and 21 MHz channels for both the I and Q signal.

21. The receiver of claim 20, wherein the analog-to-digital (A-D) converting module includes a first 12-bit A-D converter to convert the I signal from an analog signal to a digital signal, and a second 12-bit A-D converter to convert the Q signal from an analog signal to a digital signal.

22. A wireless communication system, comprising:

a substantially omni-directional antenna; and a receiver connected to the antenna to receive a desired signal over a radio frequency (RF) channel n and signals over adjacent licensed RF channels n−1 and n+1, to process the desired signal and signals over adjacent wireless channels to provide a demodulated signal corresponding to the RF channel n and a characterization of the signals over the RF adjacent channels n−1 and n+1 in real time, and to send a control signal to a transmitter of the desired signal, the control signal being based on the characterization of the signals over the RF adjacent channels n−1 and n+1.

23. The system of claim 22, wherein the RF channels n−1, n, and n+1 are within a UHF frequency range.

24. The system of claim 22, wherein the control signal includes a signal for the transmitter to adjust a power level for transmission of the desired signal over the RF channel n.

25. The system of claim 22, wherein the control signal includes a signal for the transmitter to change a frequency for transmission of the desired signal.

26. The system of claim 22, wherein the receiver includes:

a signal processing module to filter and frequency convert a signal representative of an RF signal to provide a processed signal having known first, second and third frequencies, the second known frequency of the processed signal corresponding to the RF channel n, and the first and third known frequencies of the processed signal corresponding to the RF adjacent channels n−1 and n+1; and an adjacent carrier filter module to independently filter the first and third known frequencies of the processed signal and to provide a suppressed signal representative of the RF channels n−1, n and n+1.

* * * * *